2,712,494

PREPARATION OF PHOSPHORUS OXYCHLORIDE

Paul Dupont, Paris, France, assignor to Societe Anonyme des Manufactures des Glaces et Produits Chimiques de Saint-Gobain, Chauny & Cirey, Paris, France No Drawing. Application January 16, 1951,
Serial No. 206,290

3 Claims. (Cl. 23—203)

This invention relates to the manufacture of phosphorus oxychloride, also called phosphoryl chloride, a colorless liquid used, inter alia as a reagent in chlorination and dehydration processes.

Phosphorus oxychloride, $POCl_3$, has been made by the oxidation of phosphorus trichloride, a slow process requiring the use of oxygen if any speed of reaction is to be obtained. The phosphorus trichloride and oxygen are not common or easy to use and are sufficiently expensive. Phosphorus oxychloride has also been made by chlorinating tricalcium phosphate at high temperature, but in that process much of the chlorine is lost in forming by-product calcium chloride, which has no value, and the process is wasteful.

It is an object of the invention to make $POCl_3$ economically and speedily, in distinction to the phosphorus trichloride method, and with economy of reagents and without inefficient side reactions, in distinction to the tricalcium phosphate method.

The objects of the invention are accomplished, generally speaking, by reacting chlorine with a member of the group of the phosphorus acids and their anhydrides, under reducing conditions, for instance in a reducing reaction medium, in the presence of a chlorination catalyst, for instance carbon, at a temperature on the order of 300 to 700° C. Carbon is very satisfactory because it acts both as a catalyst and as a reducing agent, the reaction of chlorine and $P_2O_5$ proceeding in its presence in accordance with the equation I       $2P_2O_5 + 6Cl_2 + 3C = 4POCl_3 + 3CO_2$ The reaction proceeds best between chlorine and phosphoric anhydride or its products of hydration, metaphosphoric acid, pyrophosphoric acid and orthophosphoric acid. The reaction of chlorine with metaphosphoric acid is represented by the equation, II     $2HPO_3 + 4Cl_2 + 2C = 2POCl_3 + 2HCl + 2CO_2$ The reaction of pyrophosphoric acid and chlorine is represented by the equation, III   $2H_4P_2O_7 + 10Cl_2 + 5C = 4POCl_3 + 8HCl + 5CO_2$ The reaction between orthophosphoric acid and chlorine is represented by the equation, IV    $2H_3PO_4 + 6Cl_2 + 3C = 2POCl_3 + 6HCl + 3CO_2$ In the reaction where phosphoric anhydride is employed as a source of phosphorus the totality of the chlorine put into the reaction appears in the phosphorus oxychloride and there are no chlorinated by-products, but when the products of hydration are employed as in Reactions II, III, and IV, HCl appears as a valuable by-product, distinguishing the process from those of the prior art in which calcium chloride appeared as a waste product.

The Reactions I to IV, hereinabove indicated, take place at temperatures on the order of 500 to 700° C. when carbon is used as the reducing agent, but the reaction can be carried out at a lower temperature, for instance between 300 and 500° C., by carrying out the chlorination in the presence of carbon monoxide as a reducing agent while still using carbon as a catalyst. This reaction is represented by the equation, V      $H_3PO_4 + 3CO + 3Cl_2 = POCl_3 + 3HCl + 3CO_2$ The chlorinating agent in Reactions I to V has been indicated as $Cl_2$, chlorine itself, but other gas phase chlorinating agents can be employed, and such gases are preferably such as to be at once chlorinating and reducing. Examples are the oxychlorides of carbon and carbon tetrachloride. In one method of carrying out the invention the phosphorus-containing reactant is prepared in advance and reacted upon by the chlorine. In another method of carrying out the invention the raw, phosphorus-containing material is formed, immediately prior to reaction, from one of the products of hydration of phosphorus anhydride. Thus, dilute orthophosphoric acid may be concentrated and dehydrated on the carbon catalyst itself, the carbon catalyst constituting a reducing reaction medium. In this way, it is easy to obtain a degree of dehydration corresponding to metaphosphoric acid, which is the form which produces the least HCl as a by-product excepting only the use of $P_2O_5$ itself, and its use is consequently preferred over that of acids having a high $H_2O$ content. A method achieving this dehydration will more fully be described hereinafter.

Wood charcoal is preferred as it is capable of being impregnated with, and of absorbing and retaining, a large quantity of phosphoric acid. The carbon should be finely divided in order to be most effective and, while the degree of division is subject to variation according to the judgment of the technician in charge, in view of the modification being employed, when optimum results are sought, at a temperature of 600° for the reaction, the carbon particles should have dimensions on the order of 150 to 400 microns. Under these conditions the chlorination reaction proceeds to completion in three to four seconds, and this makes it possible to operate the process continuously. The dehydration of orthophosphoric acid absorbed by carbon can be carried to a degree sufficient to include in the grains of charcoal a large amount of metaphosphoric acid containing an amount of $P_2O_5$ corresponding to 50% of the weight of the grain. In such impregnated grains the carbon is found to be in a material excess of that which is consumed in that chlorination reaction, the carbon playing the role of catalyst and of reducing agent, and the $P_2O_5$ thus being continually in the presence of the catalyst.

It is advantageous to keep the particles of impregnated carbon in constant motion during the reaction and this can be achieved by enclosing it in a receptacle heated to the selected temperature and blowing the chlorine through fine holes in the bottom of the receptacle and through the carbon particles. For instance, the chlorine gas may be heated to reaction temperature, for instance 600° C., and admitted to the base of a vertical column containing the impregnated carbon, the velocity of the chlorine being increased until it is sufficient to keep the grains in constant agitation. Heat can be externally applied to the reaction vessel if desired.

In the following example, which is illustrative and not a limitation, there is described the impregnation of grains of carbon and the formation of $POCl_3$ by reaction with chlorine gas. It is to be understood that the presentation of this specific example does not constitute a limitation on the generality of that which is elsewhere stated herein.

Example 1 kg. of wood charcoal, divided in grains of 150 to 400 microns was impregnated at elevated temperature with a liter of orthophosphoric acid solution containing 46% $P_2O_5$. The impregnated charcoal was dried at 200° C. and when it had lost 400 g. of weight it was subjected to a second impregnation, this time by 0.7 liter of the same acid. Drying was carried out at 200 to 220° C. until the mass of grains showed constant weight, at which time there was a mass of about 2.5 kg. of individual grains, the acid content of which was, as to $P_2O_5$ content, very close to the constitution of orthophosphoric acid. The grains were dehydrated at 500° C. in a current of inert gas, nitrogen, or carbon dioxide which kept them in constant agitation, and the resulting product was a granular mass titrating about 50% $P_2O_5$ and weighing about 2.25 kg., the acid in which was of metaphosphoric composition.

A vertical column 200 cm. high and 6.5 cm. in diameter, kept at 620° C. by exterior heating, was provided and was filled from the top with grains described above in this example at the rate of 950 g. per hour; chlorine gas was admitted at the bottom at the rate of 300 liters per hour. $CO_2$, $POCl_3$, and $HCl$ issued from the top of the column, the $POCl_3$ was isolated by condensation, and the $HCl$ by absorption in water, being passed through a standard absorber. The exhausted carbon was withdrawn from the bottom of the column at a rate equal to the addition of freshly impregnated carbon at the top so that the level of the grains was roughly constant at 120 cm. The flow of chlorine was vigorous enough to keep the grains in agitation at all times. 860 g. raw $POCl_3$ per hour were recovered, and upon rectification, distilled over wholly between 104 and 107° C. The carbon as drawn from the column contained less than 2% $P_2O_5$, and was immediately reimpregnated.

This invention employs a solid reaction medium for the reaction of a gas, the catalyst acting as a reaction medium for the combination of gaseous $Cl_2$ with phosphorus anhydride in one of its forms. The catalyst is a reducing agent as well as a chlorination catalyst. Separate chlorination catalysts and reducing agents may be used, for instance carbon and carbon monoxide respectively. Other useful chlorination catalysts are elsewhere described herein.

The form of the invention in which the phosphoric composition is fixed by impregnation on a porous carrier, which may also be a catalyst and even a reducing agent, is highly useful as the reaction may be carried out in several seconds to completion. The impregnated charcoal is itself a novel intermediate and reaction medium. The process of obtaining the intermediate is itself novel and permits one to arrive at any selected degree of dehydration by the use of impregnating solutions of selected concentration, which may be dilute if desired, the selected degree of dehydration being produced by heating the mass. It is advantageous to carry the dehydration to the stage of metaphosphoric acid, to avoid the formation of some HCl, which appears more copiously when other, more highly hydrated forms of phosphoric anhydride are used.

When CO is used, it may be passed into the reaction tube with the chlorine.

In addition to phosphoric anhydride and its water addition products (the acids containing $P_2O_5$) the other phosphorus oxides and their water addition products are useful, for instance $P_2O_3$.

The reaction proceeds swiftly and satisfactorily at atmospheric pressure, but moderately reduced pressure can be employed.

The reaction proceeds with $Br_2$ or $F_2$, in a similar way, when phosphorus oxybromide or oxyfluoride are obtained.

As to the chlorine, gaseous chlorine is preferred but the reaction proceeds in the presence of chlorine-yielding compounds of the class of the chlorinated carbon compounds as carbon oxychloride, carbon tetrachloride, etc.

As many apparently widely different embodiments of the present invention may be made without departing from the spirit and scope thereof, it is to be understood that the invention is not limited to the specific embodiments.

What is claimed is:

1. A method of making phosphorus oxychloride that comprises impregnating charcoal with a solution of orthophosphoric acid until the $P_2O_5$ corresponds to about 50% of the weight of the grain, dehydrating the acid on the charcoal at a temperature about 500° C. to a constitution approximating metaphosphoric acid, passing chlorine gas through the impregnated charcoal at a temperature between about 300 and about 700° C. with sufficient velocity to keep the grains in agitation at all times, thereby completing the reaction within a period of time of the order of seconds, and recovering the phosphorus oxychloride.

2. The method of making phosphorus oxychloride that comprises impregnating charcoal with a solution of phosphoric acid, drying the charcoal at dehydrating temperature, passing the impregnated charcoal through a reaction zone maintained at a temperature of 300 to 700° C., and passing a gaseous chlorinating agent through said reaction zone, counter-current to the charcoal at a velocity sufficient to maintain the grains of divided charcoal in constant agitation, thereby completing the reaction within a period of time of the order of seconds.

3. A method of making phosphorus oxychloride that comprises impregnating charcoal with a solution of orthophosphoric acid until the $P_2O_5$ corresponds to about 50% of the weight of the grain, dehydrating the acid on the charcoal at a temperature about 500° C. to a constitution approximating metaphosphoric acid, passing chlorine gas through the impregnated charcoal at a temperature between about 300 and about 700° C. with sufficient velocity to keep the grains in agitation at all times thereby completing the reaction within a period of time of the order of several seconds, and recovering the phosphorus oxychloride.

References Cited in the file of this patent

UNITED STATES PATENTS

| | | |
|---|---|---|
| 1,381,783 | Bartleson | June 14, 1921 |
| 2,057,433 | Ipatieff | Oct. 13, 1936 |
| 2,622,965 | Tidwell | Dec. 23, 1952 |

FOREIGN PATENTS

| | | |
|---|---|---|
| 233,840 | Great Britain | May 21, 1925 |
| 336,065 | Great Britain | Oct. 9, 1930 |
| 337,123 | Great Britain | Oct. 30, 1930 |
| 416,084 | Great Britain | Sept. 10, 1934 |